United States Patent
Maeda et al.

[11] Patent Number: 6,086,233
[45] Date of Patent: Jul. 11, 2000

[54] VEHICLE LAMP HAVING IRRADIATION ANGLE ADJUSTING MECHANISM

[75] Inventors: Manabu Maeda; Naruhiro Michiba, both of Shizuoka, Japan

[73] Assignee: Koito Manufacturing Co., Ltd., Tokyo, Japan

[21] Appl. No.: 09/199,554

[22] Filed: Nov. 25, 1998

[30] Foreign Application Priority Data

Nov. 25, 1997 [JP] Japan ................................. 9-322809

[51] Int. Cl.[7] ............................................... B60Q 1/06
[52] U.S. Cl. ..................... 362/524; 362/273; 362/549; 74/566
[58] Field of Search .................................... 362/273, 524, 362/523, 549; 74/89.14, 89.15, 566

[56] References Cited

U.S. PATENT DOCUMENTS

| | | | |
|---|---|---|---|
| 4,503,486 | 3/1985 | Makita | 362/61 |
| 4,689,725 | 8/1987 | Saijo et al. | 362/66 |
| 4,916,587 | 4/1990 | Hirose et al. | 362/273 |
| 5,331,519 | 7/1994 | Fujino | 362/66 |
| 5,541,815 | 7/1996 | Nakamura | 362/273 |
| 5,673,992 | 10/1997 | Schmitt | 362/273 |
| 5,673,993 | 10/1997 | Fukui | 362/273 |
| 5,707,133 | 1/1998 | Burton | 362/273 |
| 5,779,343 | 7/1998 | Denley | 362/273 |

Primary Examiner—Sandra O'Shea
Assistant Examiner—Perry C Neils
Attorney, Agent, or Firm—Morgan, Lewis & Bockius

[57] ABSTRACT

A vehicle lamp arrangement for mounting to a vehicle body, the lamp arrangement having an irradiation angle adjusting mechanism, including a vehicle mounting bracket mounted to the vehicle body and having a shielding portion; a lamp body portion for housing the lamp; and an adjusting shaft having a first portion completely covered by the vehicle mounting bracket and a second portion for connecting to the lamp body portion, the adjusting shaft being configured within the lamp arrangement to adjust a distance between the vehicle body and the shielding portion when the adjusting shaft is rotated such that the vehicle lamp is inclined with respect to the vehicle body, wherein upon connection of the second portion of the adjusting shaft to the lamp body portion, the second portion of the adjusting shaft is also shielded such that the rotating operation of the adjusting shaft is disabled. Adjustment of the irradiation angle is disabled at least after the irradiation angle adjusting mechanism has been assembled to the vehicle.

7 Claims, 6 Drawing Sheets

VEHICLE LAMP HAVING IRRADIATION ANGLE ADJUSTING MECHANISM

This application claims the benefit of Japanese patent application No. Hei. 9-322809, filed Nov. 25, 1997, which is hereby incorporated by reference.

BACKGROUND OF THE INVENTION

1. Field of the Invention

The present invention relates to a vehicle lamp arrangement, and more particularly to an irradiation angle adjusting mechanism of a vehicle lamp arrangement. Further, the present invention relates to the art of disabling adjustment of the irradiation angle at least after assembly to the vehicle body.

2. Discussion of the Related Art

In order to obtain preferred forward irradiation, it is necessary to adjust the irradiation angle of a vehicle lamp, especially a headlamp for a motor vehicle. In general, it is preferable not to vary the irradiation angle that has been pre-adjusted by, for example, a motor vehicle manufacturer. Such changes in the irradiation angle in a lateral direction may generate dazzling light rays that can impair passing pedestrian's vision, thus threatening traffic safety. Accordingly, automobile manufacturers are required to take adequate measures to prevent automobile users from varying the irradiation angle that has been pre-adjusted.

SUMMARY OF THE INVENTION

Accordingly, the present invention is directed to a vehicle lamp having an irradiation angle adjusting mechanism that substantially obviates one or more of the problems due to limitations and disadvantages of the related art.

An object of the present invention is to prevent adjustment of the irradiation angle at least after the lamp has been initially assembled to the vehicle body.

Additional features and advantages of the present invention will be set forth in the description which follows, and will be apparent from the description, or may be learned by practice of the invention. The objectives and other advantages of the invention will be realized and attained by the structure and process particularly pointed out in the written description and claims hereof as well as the appended drawings.

To achieve the above object, according to the present invention, as embodied and broadly described, a vehicle lamp arrangement for mounting to a vehicle body, in which the arrangement includes an irradiation angle adjusting mechanism, includes a vehicle mounting bracket mounted to the vehicle body and having a shielding portion; a lamp body portion for housing the lamp; and an adjusting shaft having a first portion completely covered by the vehicle mounting bracket and a second portion for connecting to the lamp body portion, the adjusting shaft being configured within the lamp arrangement to adjust a distance between the vehicle body and the shielding portion when the adjusting shaft is rotated such that the vehicle lamp is inclined with respect to the vehicle body, wherein upon connection of the second portion of the adjusting shaft to the lamp body portion, the second portion of the adjusting shaft is also shielded such that the rotating operation of the adjusting shaft is disabled.

In another aspect, a vehicle lamp arrangement for mounting to a vehicle body is provided in which the lamp arrangement includes an irradiation angle adjusting mechanism, including a vehicle mounting bracket mounted to the vehicle body and having an engagement portion; a lamp body portion for housing the lamp, the lamp body portion having an engagement portion; and an adjusting shaft having a first portion threadedly connected to the vehicle mounting bracket and a second portion for connecting to the lamp body portion, the adjusting shaft being configured within the lamp arrangement to adjust a distance between the vehicle body and a portion of the vehicle mounting bracket when the adjusting shaft is rotated such that the vehicle lamp body portion is inclined with respect to the vehicle body, wherein upon connection of the second portion of the adjusting shaft to the vehicle lamp body portion, the adjusting shaft is shielded such that the rotating operation of the adjusting shaft is disabled, and wherein upon connection of the second portion of the adjusting shaft to the vehicle lamp body portion, the engagement portion of the vehicle mounting bracket engages with the engagement portion of the lamp body portion to disable the rotating operation of the adjusting shaft.

In a further aspect, a vehicle lamp arrangement for mounting to a vehicle body is provided, the lamp arrangement having an irradiation angle adjusting mechanism, and including a vehicle mounting bracket mounted to the vehicle body; a lamp body portion for housing the lamp; an intermediate connection portion connected to the lamp body portion; and an adjusting shaft having a first portion connected to the vehicle mounting bracket and a second portion for connecting to the intermediate connection portion, the adjusting shaft being configured within the lamp arrangement to adjust a distance between the vehicle body and a portion of the vehicle mounting bracket when the adjusting shaft is rotated such that the vehicle lamp is inclined with respect to the vehicle body, wherein upon connection of the second portion of the adjusting shaft to the lamp body portion via the intermediate connection portion, the second portion of the adjusting shaft is also shielded such that the rotating operation of the adjusting shaft is disabled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

An illustrated embodiment of the present invention will now be described involving an irradiation angle adjusting mechanism of a headlamp for an automobile. As seen, for example, in FIG. 1, a lamp 1, such as a headlamp, for an automobile includes a lamp body 2 and a lens 3 for covering a front opening of the lamp body 2. A light source bulb (not shown) is disposed in a lamp chamber 4 defined by the lamp body 2 and the lens 3.

Figure 1:
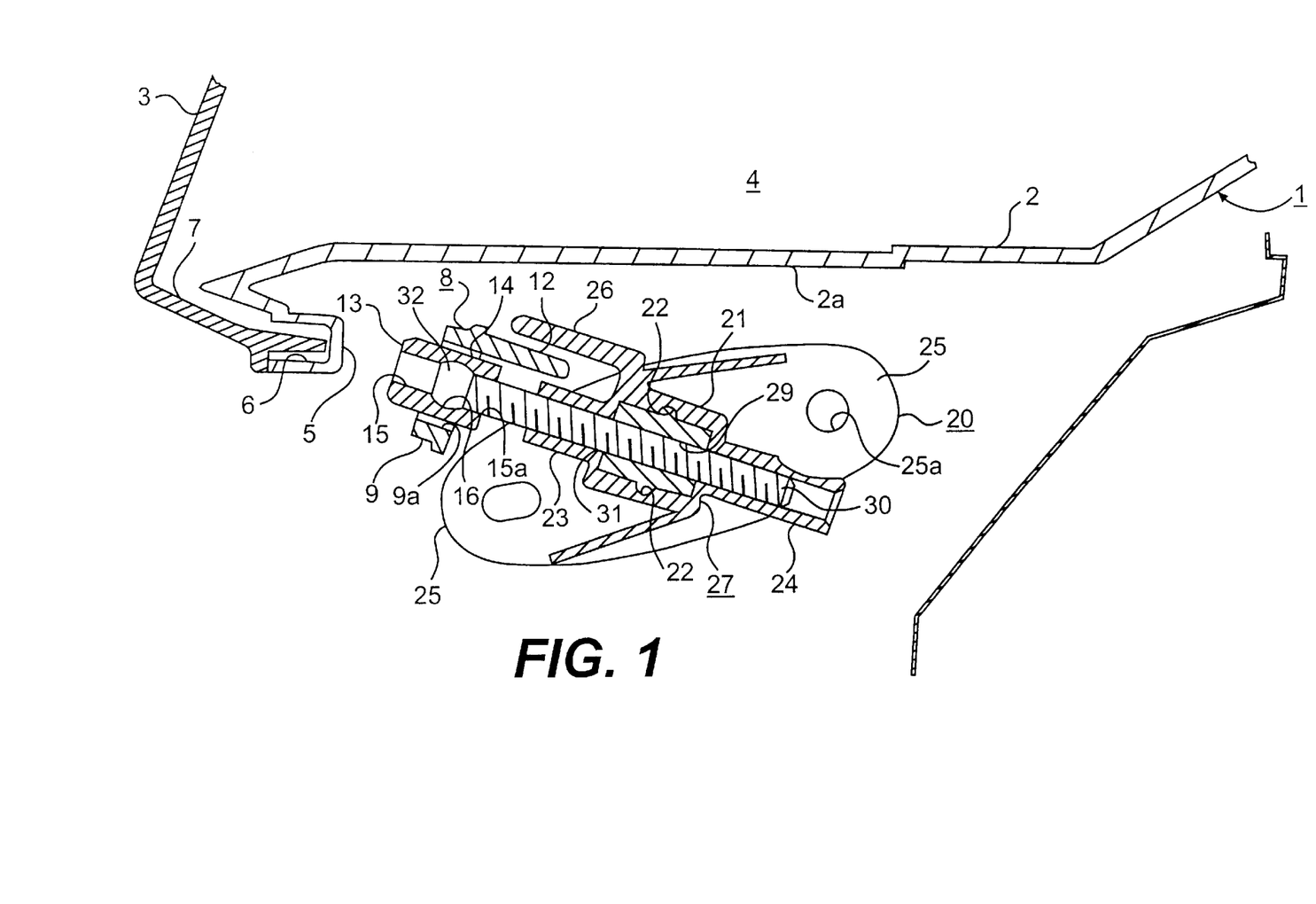
FIG. 1 shows, together with FIGS. 2 to 9, an embodiment of a vehicle lamp arrangement having an irradiation angle adjusting mechanism according to the present invention, and is a sectional view of the lamp arrangement.

The lamp body 2 has a mounting edge 5 projecting outward for mounting the lens 3 to an opening periphery thereof. A rear end of a peripheral wall 7 formed on a periphery of the lens 3 is fitted with a mounting groove 6 formed open to the mounting edge 5.

A lamp side bracket 8 is fixed to the lamp body 2 to the rear of the mounting edge 5. The lamp side bracket 8 is also shown in at least FIGS. 2 and 3. The lamp side bracket 8 is shaped such that mounting portions 10, 10 project from both sides of a supporting member 9. The lamp side bracket 8 is mounted to the lamp body 2 using screws (not shown) inserted through mounting holes 10a, 10a formed in the mounting portions 10, 10.

Figure 2:
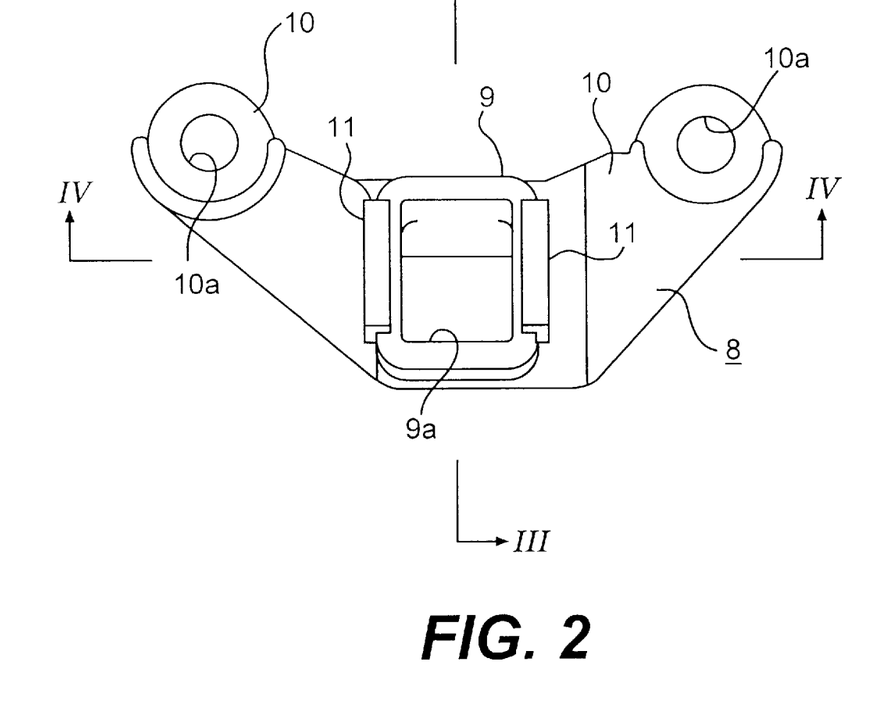
FIG. 2 shows, together with FIGS. 3 and 4, a frontal view of a lamp side bracket.
Figure 3:
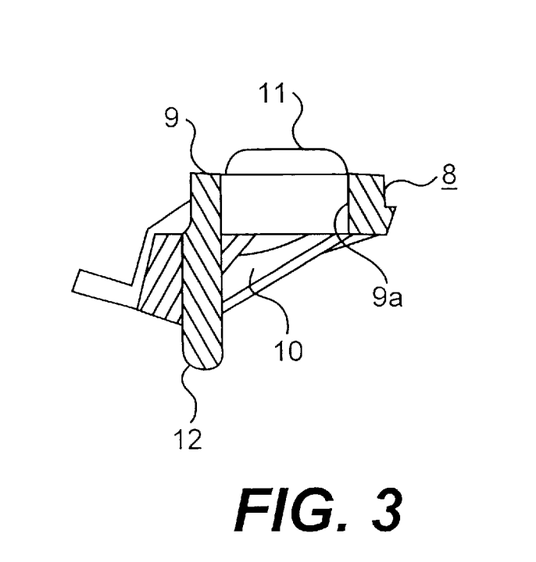
FIG. 3 is a sectional view of the lamp side bracket taken along line III—III of FIG. 2.
Figure 4:
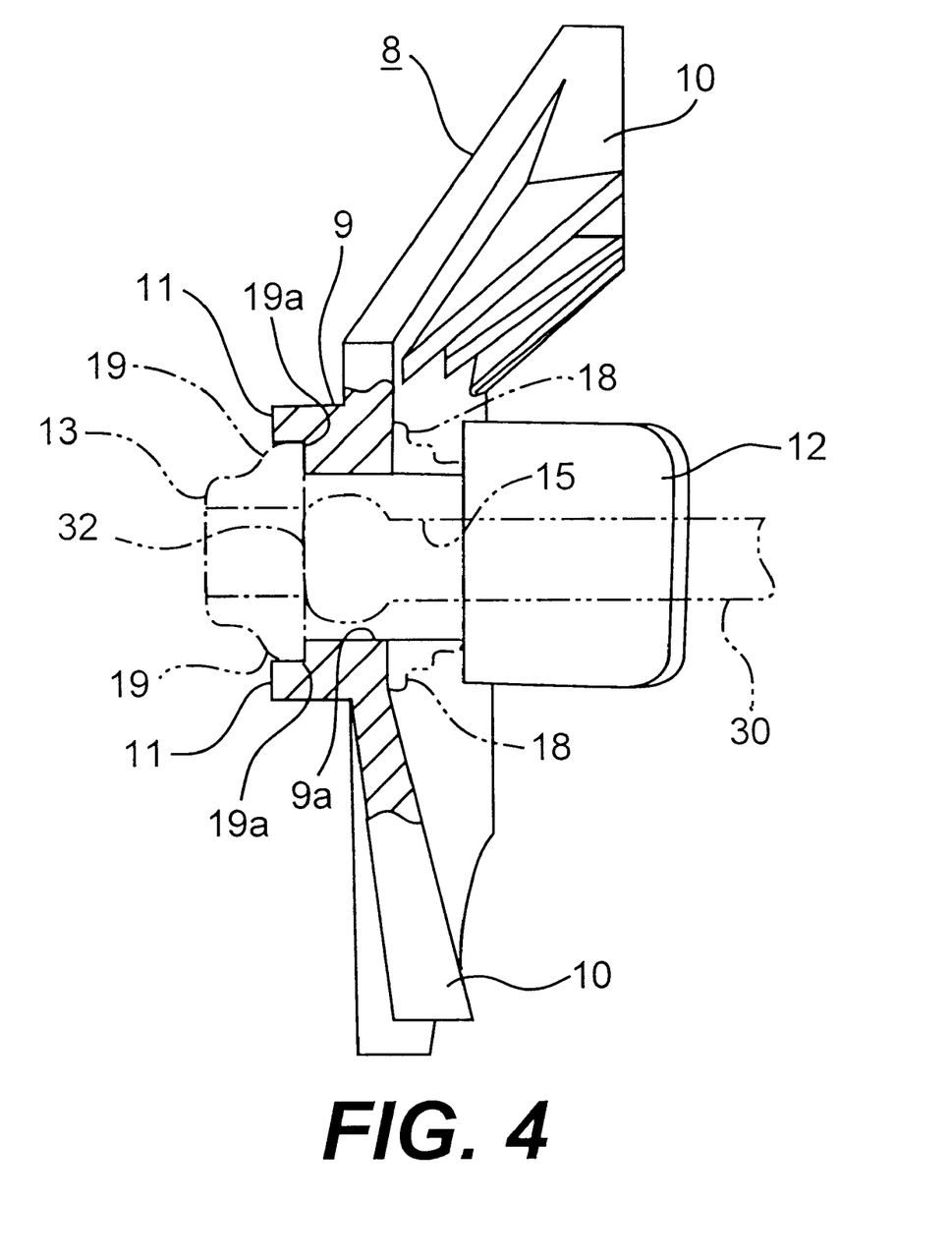
FIG. 4 is a sectional view of the lamp side bracket taken along line IV—IV of FIG. 2.

The supporting member 9 has a substantially rectangular supporting hole 9a. Shielding walls 11, 11 are formed to project forward from positions close to two opposite side edges of the supporting hole 9a of a front surface of the supporting member 9 along the side edges. Further, an engagement wall 12 is formed to project rearward from one of the remaining two side edges besides those aforementioned of a rear surface of the supporting member 9 along that direction. When the lamp side bracket 8 is mounted to the lamp body 2, the engagement wall 12 is located along a side surface 2a of the lamp body 2 slightly apart therefrom. In a state where the lamp side bracket 8 is mounted to the vehicle lamp 1, the mounting edge 6 of the lamp body 2 is located to the fore of the supporting hole 9a.

Figure 5:
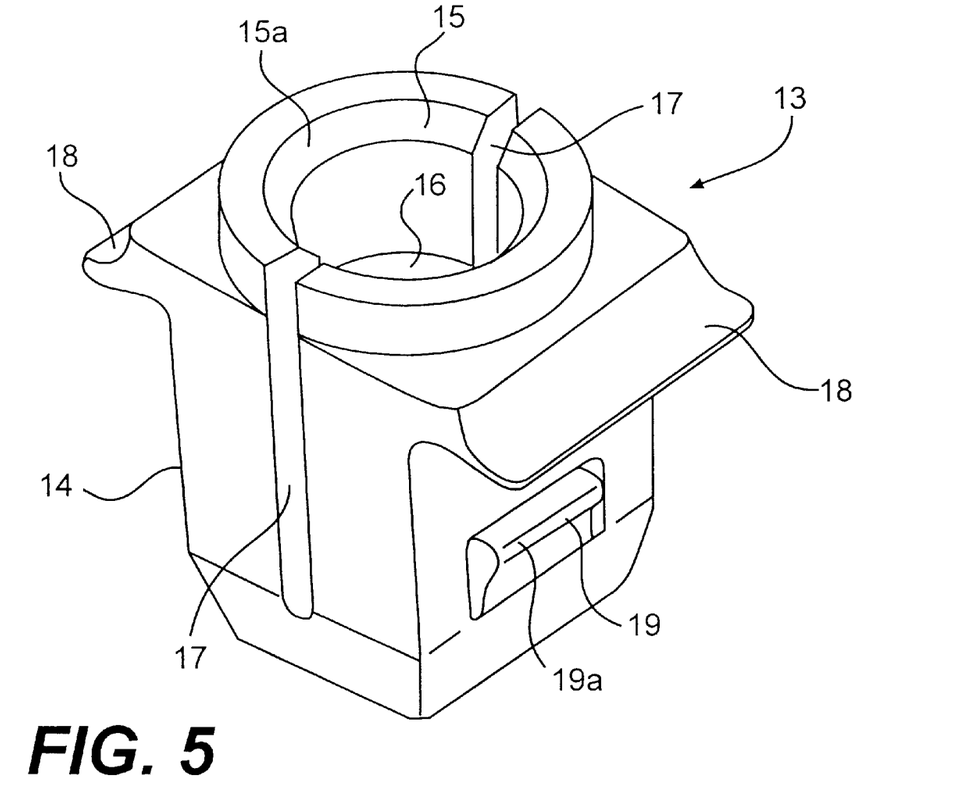
FIG. 5 is a perspective view of an intermediate connecting member.

As shown in FIG. 5, an intermediate connection member 13 is supported by the lamp side bracket 8. The intermediate connection member 13 has a through hole 15 that passes through a main portion 14 formed into a substantially short angular cylindrical shape. The through hole 15 has a substantially spherically recessed ball-receiving portion 16 formed in an intermediate portion. A rear end portion 15a of the through hole 15 is tapered such that the diameter thereof increases toward the rear end.

The main portion 14 has slits 17, 17 extending from the rear end to substantially front end forward in two opposite side walls, respectively. The slits 17, 17 reach the through hole 15 from outer side surfaces of the main portion 14.

Engagement pieces 18, 18 laterally project from rear ends of side surfaces having no slits 17, 17 of the main portion 14 formed therein. Engagement claws 19, 19 are formed on portions close to the front ends of the side walls having the engagement pieces 18, 18 formed thereon. The engagement claws 19, 19 are obtained by forming substantially recessed slits opened forward in the side walls. Rear ends 19a, 19a project from outer side surfaces of the side walls.

The intermediate connection member 13 is mounted to the lamp side bracket 8 in a manner that will now be described.

A front end of the intermediate connection member 13 is inserted into the supporting hole 9a of the lamp side bracket 8. Thus, the intermediate connection member 13 is directed such that the side surfaces having the engagement claws 19, 19 are disposed along the side edges in the vicinity of shielding walls 11, 11 of the supporting hole 9a of the lamp side bracket 8. When the intermediate connection member 13 is inserted forward into the supporting hole 9a, the engagement claws 19, 19 are pressed by the side edge of the supporting hole 9a. The engagement claws 19, 19 are receded from the outer side surfaces where they are located. When the engagement pieces 18, 18 of the intermediate connection member 13 are abutted on a rear surface of the supporting portion 9 of the lamp side bracket 8, the engagement claws 19, 19 pass through the supporting hole 9a in the forward direction. The engagement claws 19, 19 then return to the original state by resiliency and are brought into engagement with the front opening edge of the supporting hole 9a.

In this manner, the intermediate connection member 13 is mounted to the vehicle lamp 1. The intermediate connection member 13 cannot be removed from the vehicle lamp 1 unless the engagement claws 19, 19 and the opening edge of the supporting hole 9a are disengaged. The claws 19,19 cannot be pressed from outside because of shielding walls 11, 11 disposed both outer sides thereof. This prevents disengagement between the opening edge of the supporting hole 9a and the claws 19,19. Therefore, once the intermediate connection member 13 is attached to the lamp side bracket 8, the intermediate connection member 13 cannot be removed therefrom.

A vehicle mounting bracket 20, as shown at least in FIGS. 1 and 7–9, includes a support portion 21 of a shaft supporting member 27 formed into an angular cylindrical shape having one end closed. Recessed thread lines 22, 22 axially extending are formed in two opposite inner side surfaces of the support portion 21. The support portion 21 is provided with covering cylindrical members 23, 24 at its other two opposite outside surfaces in a connected way. The covering cylindrical members 23, 24 are concentrically formed having their respective ends at the side of the support portion 21 open thereto.

Figure 7:
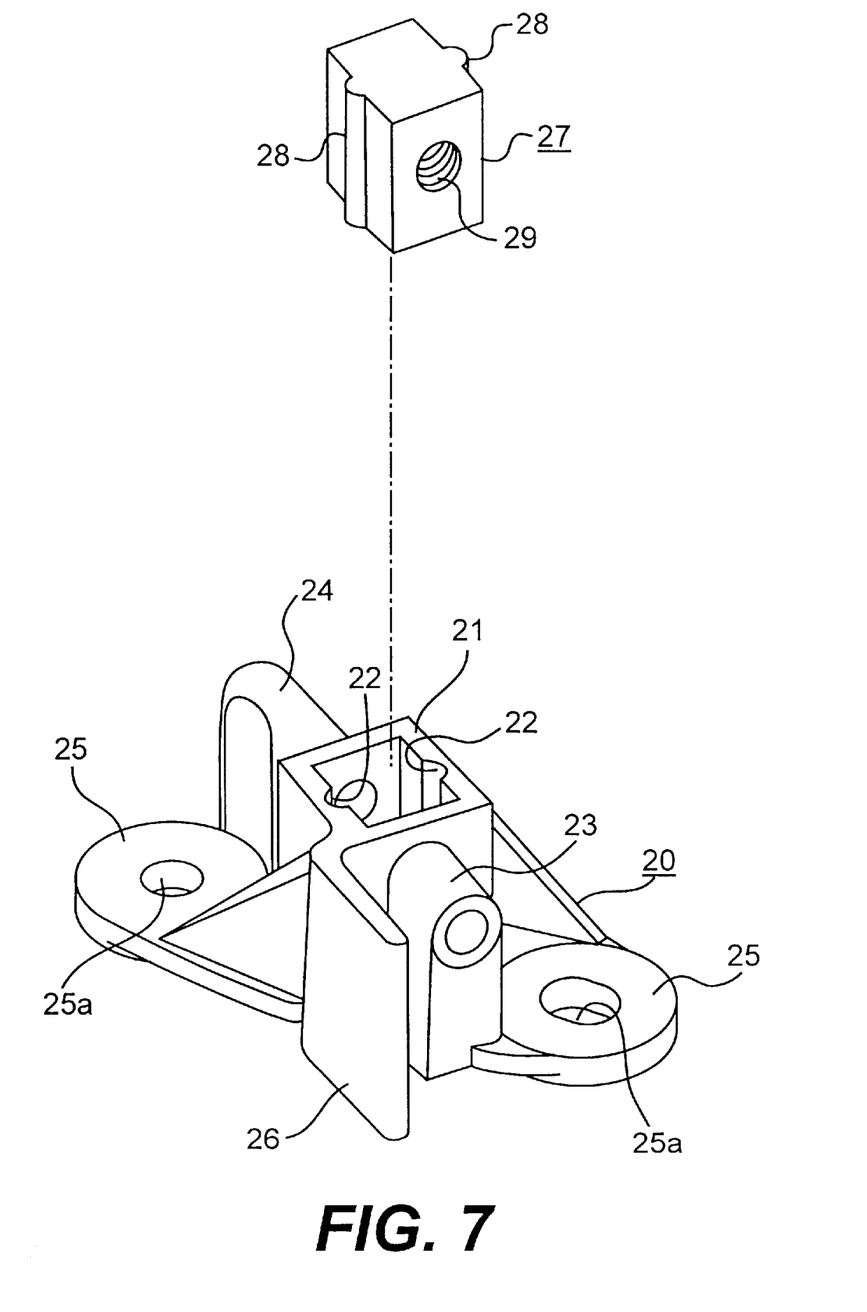
FIG. 7 is a perspective view of a vehicle mounting bracket and a shaft supporting member, which are separately shown.
Figure 8:
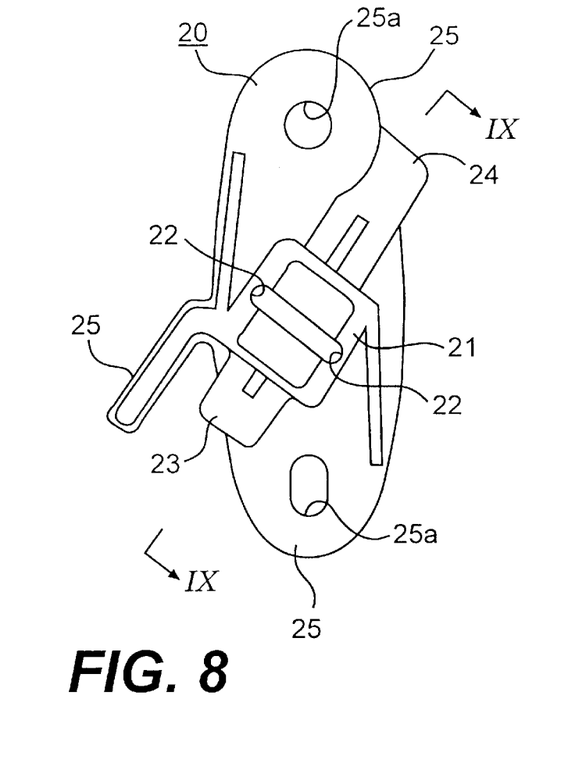
FIG. 8 is a side view of the vehicle mounting bracket.
Figure 9:
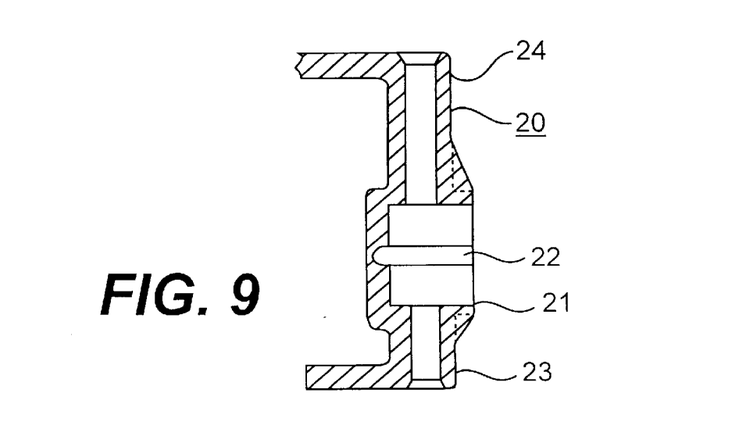
FIG. 9 is a sectional view of the vehicle mounting bracket taken along line IX—IX of FIG. 8.

Mounting pieces 25, 25 project from closed ends of the support portion 21 having mounting holes 25a, 25a formed therein.

An engagement wall 26 projects forward from one side edge of a front surface of the support 21. The engagement wall 26 is formed to project forwardly after extending in a slightly sideward direction.

A shaft supporting member 27 is supported by the support portion 21. The shaft supporting member 27 is formed into an angular block body having protrusive thread lines 28, 28 formed on two of its opposite outer side surfaces. The shaft supporting member 27 has a threaded hole 29 formed to pass through its other two opposite outer side surfaces, extending in a direction perpendicular to the direction in which the protrusive thread lines 28, 28 are extending.

The shaft supporting member 27 is supported by the support portion 21 of the vehicle mounting bracket 20. In other words, the shaft supporting member 27 is fitted with the support portion 21, and when it is so fitted, the protrusive thread lines 28, 28 of the shaft supporting member 27 are brought into engagement with the recess thread lines 22, 22 of the support portion 21. The threaded hole 29 communicates with the covering cylindrical members 23, 24.

Figure 6:
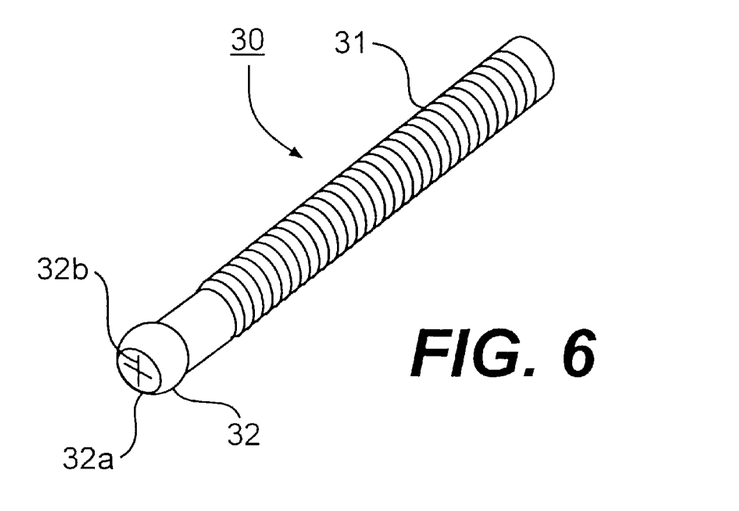
FIG. 6 is a perspective view of an adjusting shaft.

An adjusting shaft 30, as seen at least in FIGS. 1 and 6, has a spherical portion 32 integrally formed with a fore end of a threaded shaft 31. A front surface 32a of the spherical portion 32 is flat, and a cross-shaped engagement groove 32b is formed in the front surface 32a.

The threaded shaft 31 of the adjusting shaft 30 is inserted into the covering cylindrical members 23, 24 of the vehicle mounting bracket 20, and an intermediate portion of the adjusting shaft 30 located in the covering cylindrical members 23, 24 is screwed to the threaded hole 29 of the shaft supporting member 27. The threaded hole 29 may be simply formed as an unthreaded circular hole prior to screwing of the adjusting shaft 30 thereto. That is, the threaded hole 29 may be formed as a self-tap type nut which is threaded by screwing of the adjusting shaft 30.

The spherical portion 32 formed on the front end of the adjusting shaft 30 is fitted with the ball-receiving portion 16 of the intermediate connection member 13. In other words, the spherical portion 32 is pressed forward into the rear end 15a of the through hole 15 of the intermediate connection member 13 to be fitted with the ball-receiving portion 16. Therefore, the front end of the adjusting shaft 30 is connected to the intermediate connection member 13 in a manner of a ball joint.

The mounting of the vehicle lamp 1 to the vehicle body will now be described. First, the shaft supporting member 27 is supported by the vehicle mounting bracket 20 as described above, and the threaded shaft 31 of the adjusting shaft 30 is further screwed to the shaft supporting member 27.

In this state, a tip end of a plus screwdriver is engaged with the engagement groove 32b formed in the front surface of the spherical portion 32 of the adjusting shaft 30 to rotate the adjusting shaft 30. The threaded shaft 31 of the adjusting shaft 30 is screwed to or unscrewed from the shaft supporting member 27 for adjusting a projecting amount of the adjusting shaft 30 from the vehicle mounting bracket 20. Meanwhile the lamp side bracket 8 is fixed to the lamp body 2, and the intermediate connection member 13 is mounted to the lamp side bracket 8.

The spherical portion 32 of the adjusting shaft 30 supported by the vehicle mounting bracket 20 as described above is then fitted with the ball-receiving portion 16 of the intermediate connection member 13 supported by the lamp side bracket 8 to the lamp body 2. Concurrently the engagement wall 12 of the lamp side bracket 8 and the engagement wall 26 of the vehicle mounting bracket 20 are engaged with each other.

The vehicle mounting bracket 20 is then fixed to the vehicle body (not shown), and the mounting operation of the vehicle lamp 1 to the vehicle body is completed.

The vehicle lamp 1 is also connected to the vehicle body at positions other than those where it is connected to the vehicle body through the aforementioned irradiation angle adjusting mechanism. As an example, two other positions of the vehicle lamp 1 are connected to the vehicle body through other connecting mechanisms.

In an arrangement where the adjusting shaft 30 is connected to the vehicle lamp 1, an operating portion of the adjusting shaft 30, for example, the front surface 32a of the spherical portion 32 having the engagement groove 32b, is covered with the mounting edge 5 of the lamp body 2. Therefore, it is no longer possible to rotate the adjusting shaft 30 to vary the projecting amount of the adjusting shaft 30 from the vehicle mounting bracket 20.

Further, as most of the adjusting shaft 30, including the threaded portion 31, is covered with the covering cylindrical members 23, 24 of the vehicle mounting bracket 20, a shaft portion of the adjusting shaft 30 cannot be gripped by, for example, any jig for effectuating a rotating operation.

Further, because the engagement wall 12 of the intermediate connection member 13 and the engagement wall 26 of the vehicle mounting bracket 20 are engaged with each other, the adjusting shaft 30 can neither be further screwed to or unscrewed from the shaft supporting member 27 by rotating the vehicle mounting bracket 20. As a result, it is no longer possible to vary the projecting amount of the adjusting shaft 30 from the vehicle mounting bracket 20.

Moreover, the engagement claws 19, 19 of the intermediate connection member 13 are shielded in a sideward direction by the shielding walls 11, 11 that are formed on the lamp side bracket 8. Therefore, it is not possible for a user to rotate the adjusting shaft 30 to vary its projecting distance from the vehicle mounting bracket 20 when the intermediate connection member 13 is connected to the lamp side bracket 8 because of the extreme difficulty of the intermediate connection member 13 via its engagement claws 19, 19.

Therefore, once the irradiation angle of a lamp has been adjusted by an automobile manufacturer, for example, a user of the automobile is not able to make further adjustments to the irradiation angle.

Although the intermediate connection member 13 is supported on the vehicle lamp 1 through the lamp side bracket 8 in the above described embodiment, it may be directly supported by the vehicle headlamp 1, i.e., lamp body 2. In such a case, the engagement wall 12 may preferably be integrated with the lamp body 2.

Further, the shaft supporting member 27 may be integrally formed with the vehicle mounting bracket 20. If the shaft supporting member 27 is formed separately from the vehicle mounting bracket 20, the vehicle mounting bracket 20 can be formed of the material exhibiting high rigidity such as a synthetic resin containing glass fiber. Meanwhile the shaft supporting member 27 can be formed of an appropriate material, such as a nylon resin, to be used for producing a nut.

In the aforementioned embodiment, the adjusting shaft 30 is screwed to the vehicle mounting bracket 20 and is connected to the lamp side bracket 8 in a ball joint manner. It may also be structured such that the adjusting shaft 30 is connected to the vehicle mounting bracket 20 in the ball joint manner, and is screwed to the lamp side bracket. In such an arrangement, a ball-receiving portion may be formed in a member corresponding to the shaft supporting member 27, and a nut member may be used as the member corresponding to the intermediate connection member 13. In the foregoing arrangement, the inner diameters of members corresponding to the covering cylindrical members 23, 24 have to be slightly enlarged so as not to interrupt the inclination of the adjusting shaft 30.

As described above, according to the present invention, there is provided an irradiation angle adjusting mechanism of a vehicle lamp, in which the vehicle lamp and a vehicle body are connected with each other through an adjusting shaft. The adjusting shaft is rotated to adjust a distance between the vehicle body and its portion connected to the adjusting shaft such that the vehicle lamp is inclined with respect to the vehicle body. The adjusting shaft is mounted to the vehicle body through a vehicle mounting bracket, and is completely covered by the vehicle mounting bracket. Moreover, when the adjusting shaft is connected to the vehicle lamp, an operating portion of the adjusting shaft is shielded such that any further rotating operation of the adjusting shaft is disabled.

Therefore in the irradiation angle adjusting mechanism of a vehicle lamp, once the adjusting shaft is mounted to the vehicle lamp so as not to be further rotated, the irradiation angle cannot be adjusted by the user.

According to another aspect of the present invention, there is provided an irradiation angle adjusting mechanism of a vehicle lamp, in which the vehicle lamp and a vehicle body are connected to each other through an adjusting shaft. The adjusting shaft is rotated to adjust a distance between the vehicle body and its portion connected to the adjusting shaft such that the vehicle lamp is inclined with respect to the vehicle body. The adjusting shaft is threadedly connected to the vehicle mounting bracket. Further, when the adjusting shaft is connected to the vehicle lamp, an operating portion of the adjusting shaft is shielded such that any rotating operation of the adjusting shaft is disabled. An engagement portion formed on the vehicle mounting bracket engages with an engagement portion formed on the vehicle lamp such that any rotating operation of the vehicle mounting bracket around an axis of the adjusting shaft is disabled.

As a result, in the irradiation angle adjusting mechanism of a vehicle lamp of the present invention, once the adjusting shaft has been connected to the vehicle lamp, the distance between the vehicle mounting bracket and the vehicle lamp cannot be changed by rotating the vehicle mounting bracket. This helps to prevent an individual from readjusting the irradiation angle of the vehicle lamp once the vehicle leaves the hands of the manufacturer, for example.

According to another aspect of the present invention, there is provided an irradiation angle adjusting mechanism of a vehicle lamp, in which the vehicle lamp and a vehicle body are connected to each other through an adjusting shaft. The adjusting shaft is rotated to adjust a distance between the vehicle body and its portion connected to the adjusting shaft such that the vehicle lamp is inclined with respect to the vehicle body. The adjusting shaft is connected to the vehicle lamp through an intermediate connection member that is mounted to the vehicle lamp through engagement between engagement claws of the intermediate connection member and the vehicle lamp. When the adjusting shaft is connected to the vehicle lamp, an operating portion of the adjusting shaft is shielded such that any rotating operation of the adjusting shaft is disabled. Moreover, disengagement of the engagement claw of the intermediate connection member and the vehicle lamp is also disabled.

Therefore, in the irradiation angle adjusting mechanism of a vehicle lamp of the present invention, once the adjusting shaft is connected to the vehicle lamp, it is not possible to remove the intermediate connection member from the vehicle lamp, and thus, rotation of the shaft is halted. Moreover, it is no longer possible to operate the operating portion of the adjusting shaft. As a result, the user is not able to adjust the irradiation angle.

It will be apparent to those skilled in the art that various modifications and variations can be made in the vehicle lamp arrangement of the present invention without departing from the spirit or scope of the invention. Thus, it is intended that the present invention cover the modifications and variations of this invention provided they come within the scope of the appended claims and their equivalents.

What is claimed is:

1. A vehicle lamp arrangement for mounting to a vehicle body, the lamp arrangement having an irradiation angle adjusting mechanism, comprising:
   a vehicle mounting bracket mounted to the vehicle body and having a shielding portion;
   a lamp body portion for housing the lamp;
   an intermediate connection portion connected to the lamp body portion; and
   an adjusting shaft having a first portion completely covered by the vehicle mounting bracket and a second portion for connecting to the intermediate connection portion, the adjusting shaft being configured within the lamp arrangement to adjust a distance between the vehicle body and the shielding portion when the adjusting shaft is rotated such that the vehicle lamp is inclined with respect to the vehicle body,
   wherein upon connection of the second portion of the adjusting shaft to the lamp body portion via the intermediate connection portion, the second portion of the adjusting shaft is also shielded by the intermediate connection portion such that the rotating operation of the adjusting shaft is disabled.

2. A vehicle lamp arrangement for mounting to a vehicle body, the lamp arrangement having an irradiation angle adjusting mechanism, comprising:
   a vehicle mounting bracket mounted to the vehicle body and having an engagement portion;
   a lamp body portion for housing the lamp, the lamp body portion having an engagement portion; and
   an adjusting shaft having a first portion threadedly connected to the vehicle mounting bracket and a second portion for connecting to the lamp body portion, the adjusting shaft being configured within the lamp arrangement to adjust a distance between the vehicle body and a portion of the vehicle mounting bracket when the adjusting shaft is rotated such that the vehicle lamp body portion is inclined with respect to the vehicle body,
   wherein upon connection of the second portion of the adjusting shaft to the vehicle lamp body portion, the adjusting shaft is shielded such that the rotating operation of the adjusting shaft is disabled, and
   wherein upon connection of the second portion of the adjusting shaft to the vehicle lamp body portion, the engagement portion of the vehicle mounting bracket engages with the engagement portion of the lamp body portion to disable the rotating operation of the adjusting shaft.

3. A vehicle lamp arrangement for mounting to a vehicle body, the lamp arrangement having an irradiation angle adjusting mechanism, comprising:
   a vehicle mounting bracket mounted to the vehicle body;
   a lamp body portion for housing the lamp;
   an intermediate connection portion connected to the lamp body portion; and
   an adjusting shaft having a first portion connected to the vehicle mounting bracket and a second portion for connecting to the intermediate connection portion, the adjusting shaft being configured within the lamp arrangement to adjust a distance between the vehicle body and a portion of the vehicle mounting bracket when the adjusting shaft is rotated such that the vehicle lamp is inclined with respect to the vehicle body,
   wherein upon connection of the second portion of the adjusting shaft to the lamp body portion via the intermediate connection portion, the second portion of the adjusting shaft is also shielded by the intermediate connection portion such that the rotating operation of the adjusting shaft is disabled.

4. The vehicle lamp arrangement of claim 3, wherein the intermediate connection portion is mounted to a lamp side bracket mounted on the lamp body portion, and
   wherein engagement claws are provided on the intermediate connection portion so that upon connection of the second portion of the adjusting shaft to the lamp side bracket via the intermediate connection portion, the engagement claws of the intermediate connection portion are configured to become securely engaged with the lamp side bracket.

5. The vehicle lamp arrangement of claim 4, wherein the lamp side bracket includes a substantially rectangular supporting hole for receiving a main portion of the intermediate connection member.

6. The vehicle lamp arrangement of claim 4, wherein the intermediate connection portion further includes respective engagement pieces provided to extend over each of the respective engagement claws to protect the respective engagement claws from being disengaged from the lamp side bracket once the intermediate connection portion and the lamp side bracket are connected together.

7. The vehicle lamp arrangement of claim 4, wherein the vehicle mounting bracket includes an engagement portion and the lamp side bracket includes an engagement portion, wherein upon connection of the second portion of the adjusting shaft to the vehicle lamp body portion via the intermediate connection member, the engagement portion of the vehicle mounting bracket engages with the engagement portion of the lamp side bracket to disable the rotating operation of the adjusting shaft.

* * * * *